United States Patent [19]

Meriläinen

[11] Patent Number: 5,509,488
[45] Date of Patent: Apr. 23, 1996

[54] DEVICE AND METHOD FOR CLEARING TREES/BUSHES AND TILLING SOIL

[75] Inventor: Tuomo Meriläinen, Sotkamo, Finland

[73] Assignee: Suokone Oy, Vuokatti, Finland

[21] Appl. No.: 305,207

[22] Filed: Sep. 13, 1994

[30] Foreign Application Priority Data

Sep. 15, 1993 [FI] Finland ................................. 934044

[51] Int. Cl.⁶ .................................................. A01B 33/16
[52] U.S. Cl. .......................... 172/63; 172/122; 172/540; 172/40
[58] Field of Search ............................. 172/70, 112, 119, 172/122, 123, 63, 60, 148, 150, 540, 539, 40, 45, 68, 70, 71, 72; 171/24

[56] References Cited

U.S. PATENT DOCUMENTS

| 428,187 | 5/1890 | Verliff | 172/539 |
|---|---|---|---|
| 3,892,278 | 7/1975 | Smith et al. | 172/70 |
| 3,952,811 | 4/1976 | Carre | 172/45 |
| 4,098,344 | 7/1978 | Johnson | 172/68 X |
| 4,220,184 | 9/1980 | Hallett et al. | 172/45 X |
| 4,256,182 | 3/1981 | Nething | 172/45 |
| 4,522,267 | 6/1985 | Lewison | 172/45 X |
| 4,690,224 | 9/1987 | Shwez | 172/68 X |
| 4,867,606 | 9/1989 | Wright | 172/40 X |

FOREIGN PATENT DOCUMENTS

| 2544027 | 9/1976 | Germany. |
|---|---|---|
| 3128466 | 1/1983 | Germany. |

*Primary Examiner*—Randolph A. Reese
*Assistant Examiner*—Victor Batson
*Attorney, Agent, or Firm*—Steinberg, Raskin & Davidson

[57] ABSTRACT

A cutter, device and cutting method utilizing the same including cutter blades which work soil and wood material and which are arranged on a cutter drum to rotate and by-pass a counter blade. The device includes a tamping drum which is displaceable in relation to a frame of the cutter device by an actuator.

18 Claims, 8 Drawing Sheets

DEVICE AND METHOD FOR CLEARING TREES/BUSHES AND TILLING SOIL

BACKGROUND OF THE INVENTION

The present invention relates to a cutter device and a cutting method for clearing trees and bushes and tilling soil.

In the prior art, methods are known for clearing trees and bushes and tilling soil in which a cutter drum of a cutter device is rotated by means of the power take-off of an accompanying tractor. The cutter drum comprises a number of blades which are arranged so that during the cutting process, the blades penetrate into the ground and transfer the soil material removed off the ground further into contact with a counter blade to the rear side of the cutter drum. Power is brought to the cutter device from the power take-off of the tractor, and the cutter device is displaced, while mounted on the three-point linkage of the tractor, by means of the power unit of the tractor.

A conventional cutter device also comprises a transmission, at one end or both ends of the cutter drum, through which rotative force is transferred to the shaft of the cutter drum. Each blade of the cutter is mounted on a blade holder of its own which is fixed to the mantle of the cutter drum. The blade comprises a narrowing, tapering hard-metal tip which is worn uniformly. The cutter devices are used, e.g., for crushing trees and, on the whole, for clearing bushes and undergrowth in connection with tilling soil.

It has been noted that when using such conventional prior art cutter devices, smooth feed of the wood material into contact with the cutter blades constitutes a problem.

OBJECTS AND SUMMARY OF THE INVENTION

It is an object of the present invention to provide a new and improved cutting method and cutter device in which the feed of wood material, e.g., from upright trees or bushes, to the cutter drum is facilitated.

In accordance with the invention, the cutter device includes a tamping drum which is positioned and displaced by means of an actuator and is arranged at the forward side of the cutter drum in a running direction of the device. Preferably, the tamping drum is positioned at a distance from the tractor during the cutting process. This has proved necessary especially when tree stumps are cut, in which connection the positioning of the tamping drum and the support produced by the tamping drum during cutting prevent lateral movement or swinging of the cutter drum. When the cutter drum is displaced by means of an actuator, the undergrowth, in particular trees and bushes, are pressed by the tamping drum tightly against the ground, whereby this vegetation is fed into contact with the cutter blades in the correct direction when pressed against the ground.

In a preferred embodiment, the cutter device comprises a separate movable felling arm which is positionable in a multitude of positions and is placed at the forward side of and above the tamping drum, i.e., further away from ground level. By means of the felling arm, a tree can be grasped at a sufficiently high level above ground level, and it can be pressed efficiently towards the ground, after which it is pressed by the tamping drum. When pressed against the ground by the tamping drum, the tree is brought into contact with the blades of the cutter drum.

In accordance with the invention, both the frame of the tamping drum and the felling arm are mounted on a separate holder part which is attached to the frame part of the cutting drum by means of screw devices or other suitable fastening means. Thus, the holder part comprises means both for mounting the tamping drum and for mounting the felling arm. Preferably, the tamping drum comprises two actuators, preferably cylinder devices, which are placed at both sides of the central axis (X-axis) of the machine. The felling arm operates by means of one actuator, preferably a cylinder device, which is placed on the central axis (X-axis) of the machine. Preferably, all of the actuators are hydraulic cylinders which can be readily coupled to the hydraulic couplings of the tractor.

The tamping drum comprises a skeleton frame whereby forces are applied by means of the actuators connected thereto through the skeleton frame to the shaft of the tamping drum in order to position the tamping drum. The actuators cannot be connected directly with separate end frames of the tamping drum because they would produce an excessively high torque on the tamping drum itself. Therefore, a skeleton frame is used which extends beyond the width of the device. The skeleton frame of the tamping drum is made of square-section beam and forms a sufficiently rigid frame system when the tamping drum presses the wood material with force against the ground. In a corresponding manner, the felling arm comprises a separate frame skeleton extending beyond the width of the machine, and a fork-like space defined at the end of the skeleton, into which the wood material is guided. By operating the actuator of the felling arm, which is preferably a hydraulic cylinder, it is possible to press the wood material towards the ground, whereupon, by operating the actuator of the tamping drum, the wood material is pressed ultimately against the ground, after which it enters into contact with the cutter blades.

The basic cutter device in accordance with the invention comprises a tamping drum which is displaceable in relation to the frame of the cutter device and which is mounted to revolve in relation to its frame. The device further comprises an actuator, preferably a cylinder device, by whose means the frame of the tamping drum and the tamping drum mounted on the frame can be positioned in relation to the frame.

In the method in accordance with the invention for clearing trees/bushes and for tilling soil, wood material is guided into contact with the cutter blades by displacing a felling arm to tilt wood material toward the ground, pressing the wood material against the ground by means of a tamping drum, and passing the pressed wood material into contact with the cutter blades on the cutter drum. The felling arm is displaced by means of an actuator and serves to turn the wood material to a suitable angle in relation to the tamping drum. Thus, the wood material is first tilted by means of the felling arm toward the ground, pressed by means of the tamping drum against the ground and passed further into contact with the cutter blades on the cutter drum by moving the cutter device.

In preferred embodiments, the positioning of the tamping drum is controlled relative to movement of the cutter device such that the tamping drum supports the cutter device when the cutter device is stationary. Means may be provided to enable displacement of the tamping drum relative to a frame of the cutter device whereby it is possible to independently control the displacement of the tamping drum and the felling arm by remote control by providing separate actuators coupled to the tamping drum and the felling arm.

The invention will be described in the following with reference to some preferred embodiments of the invention shown in the figures in the accompanying drawings. However, the invention is not confined to these embodiments alone.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1A:
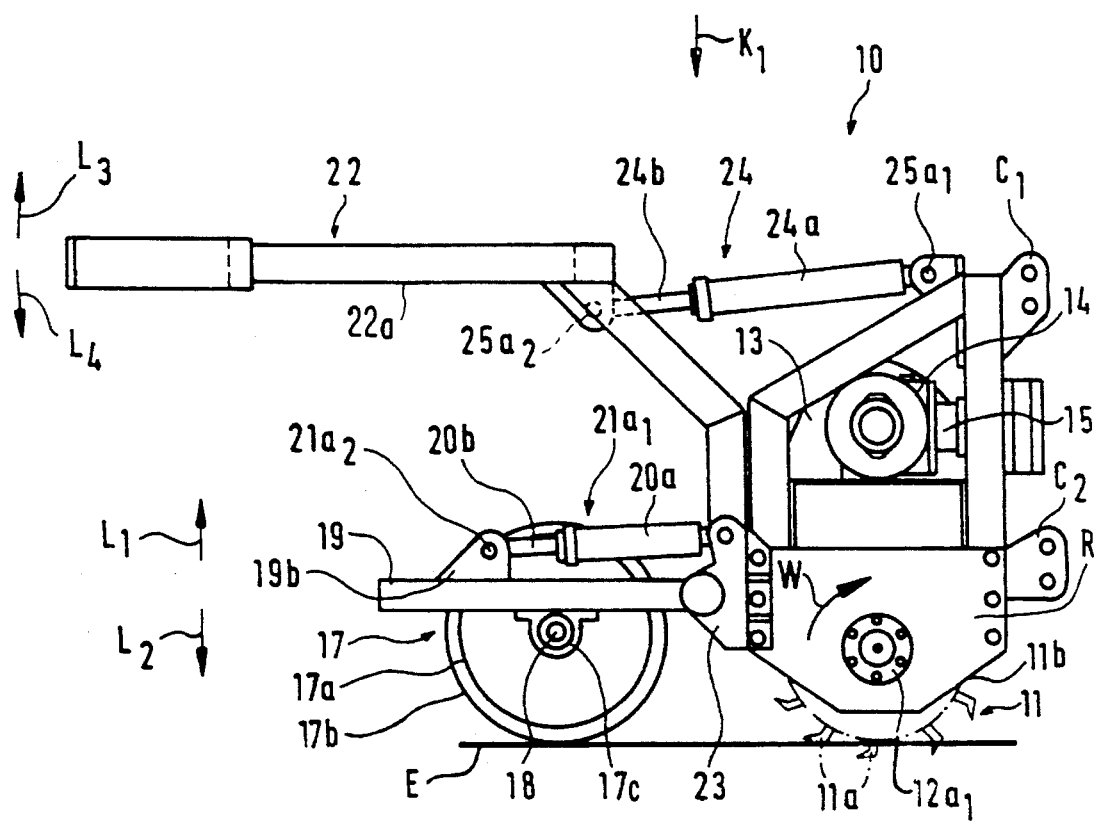
FIG. 1A is a side view of a cutter device in accordance with the invention which is used in a method in accordance with the invention.

Referring to the drawings wherein like reference numerals refer to the same elements, FIG. 1A shows a cutter device 10 in accordance with the invention. The cutter device comprises a cutter drum 11 which is rotated in a direction W. The cutter drum comprises cutter blades $11a_1, 11a_2, \ldots$ mounted on a mantle 11b of the cutter drum 11. The frame of the cutter device 10 is denoted by reference R. The cutter drum is arranged to revolve on support of bearing means $12a_1$, $12a_2$ (as shown in FIG. 1D). The rotating drive is brought from the power machine, preferably a tractor, to an input shaft 15 of a bevel gearing 14 to an output shaft $16a_1$ of the bevel gearing (T-gearbox). The rotation movement is transferred further to a transmission 13 and through the transmission to a shaft $11c_1$ of the cutter drum. The drive to the cutter drum 11 can also be brought from both ends of the cutter drum whereby, in this embodiment, the device should be provided with a transmission 13 at each end of the frame. In such a case, the rotation drive is distributed both to the output shaft $16a_1$ and to an additional output shaft $16a_2$ of the bevel gearing 14.

Figure 1B:
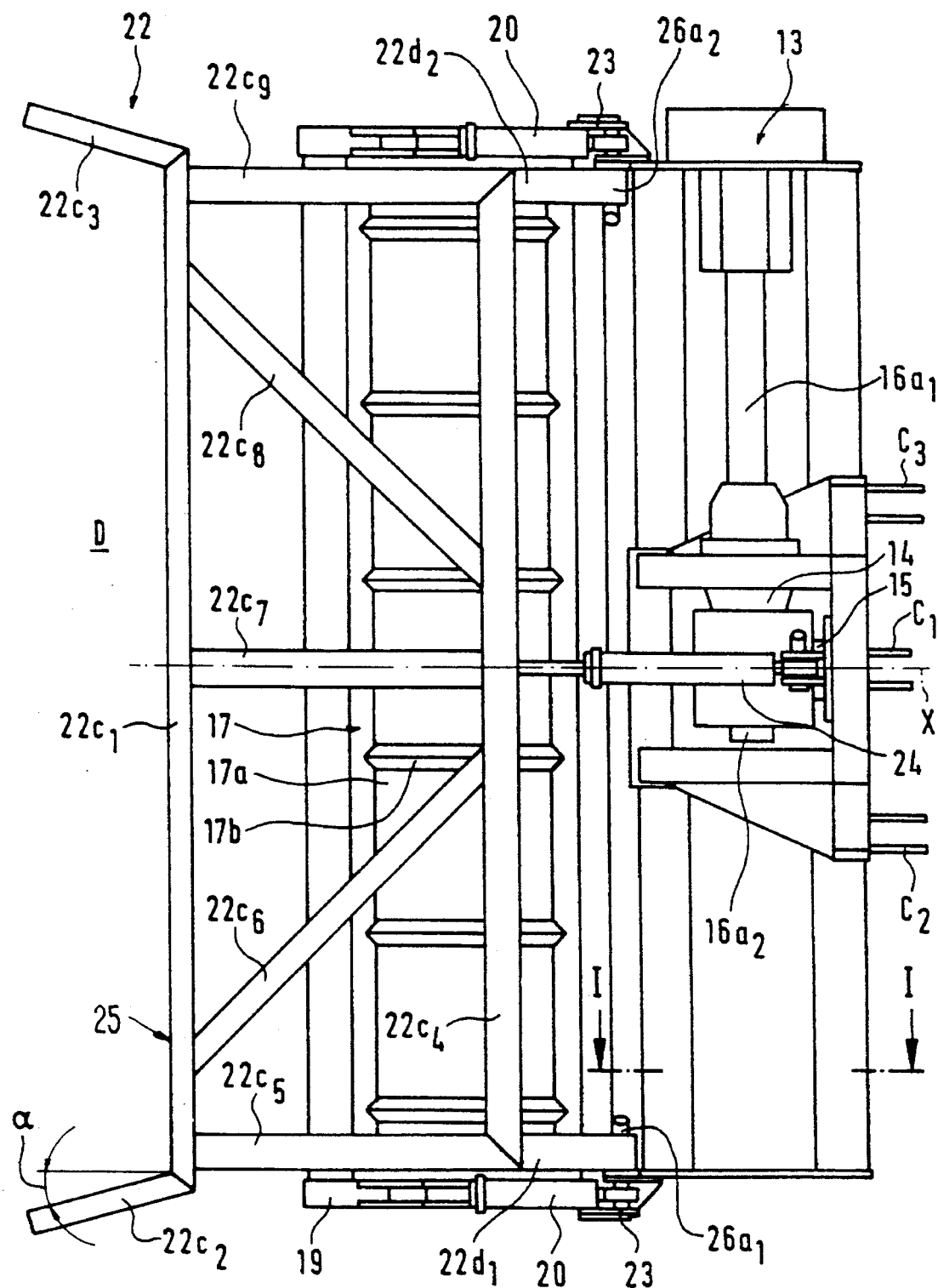
FIG. 1B shows the device viewed in the direction of the arrow $K_1$ in FIG. 1A.

The cutter device is supported on the three-point linkage of the power machine while the frame comprises three fastening points $C_1, C_2$ and $C_3$ for the three-point linkage (as shown in FIG. 1B), by means of which the device can be connected to corresponding fastening points of the power machine, e.g., tractor.

The device in accordance with the invention also comprises a tamping drum 17 displaceable by means of an actuator, preferably a cylinder device 20. The tamping drum 17 comprises a mantle 17a of the tamping drum and therein a number of mantle rigidifiers or rigidizing members 17b having a substantially triangular section shape. The mantle rigidifiers 17b serve to reinforce the tamping drum 17. The tamping drum 17 is connected from its end shafts 17c to bearings 18 and further to a frame 19 which is a skeleton construction.

Actuator 20 is preferably a hydraulic cylinder and comprises a cylinder body 20a and an extendible cylinder rod 20b. The actuator 20 is connected from bearing means $21a_1$ of the cylinder body 20a by means of an articulated joint to a holder part 23 and from bearing means $21a_2$ at the side of the cylinder rod 20b by means of an articulated joint to a bracket 19b of the frame 19. When the actuator 20 is operated, the frame 19 and the tamping drum 17, which is mounted revolvingly on the frame 19, are displaced in relation to the frame R of the cutter device 10. This positioning is illustrated by arrows $L_1$ and $L_2$.

As shown in FIG. 1A, the device further comprises a felling arm 22 placed in front of the tamping drum 17 (seen in the direction of movement $S_1$ of the device), which felling arm 22 is arranged to be placed both above the cutter device 10 and above the tamping drum 17, relative to ground level. The felling arm 22 comprises an actuator 24, preferably a cylinder device such as a hydraulic cylinder, which is linked from body 24a of the hydraulic cylinder by bearing means $25a_1$ on the frame R of the cutter device 10 and from a rod 24b of the cylinder device by bearing means $25a_2$ on the frame beam of the felling arm 22.

By operating the actuator 24, the felling arm 22 is displaced in the direction of arrows $L_3$ and $L_4$ so that, by means of the actuator 24, the felling arm 22 is brought into contact with the wood material P, e.g., a tree. Further, by means of the power of the actuator, the wood material is pressed toward/against the ground. Since the upper arm portion 22a of the felling arm 22 is placed high in relation to the ground E, a sufficient torque distance is obtained for felling the tree. In this manner, the tree can be pressed efficiently toward/against the ground before the wood material P meets the tamping drum 17 placed in front of the cutter drum 11.

FIG. 1B shows the device viewed in the direction of the arrow $K_1$ in FIG. 1A, i.e., from above, and shows that the frame 19 of the tamping drum 17 is connected with two actuators 20 on each side of the tamping drum 17. The felling arm 22 comprises only one actuator 24 connected with it, preferably a hydraulic cylinder, which is placed on the central axis X of the device. The felling arm 22 also comprises a frame portion $22C_1$ perpendicular to the central axis X and frame portions $22C_2$ and $22C_3$ connected with the frame portion $22c_1$ and placed at an angle $\alpha$ to the central axis X. Frame portions $22c_1, 22c_2$ and $22c_3$ of the felling arm 22 define a fork 25 shaped space D into which the wood material is first brought and after which, when the actuator 24 shifts the felling arm 22 downwards, causes the wood material P to be tilted towards the ground E.

The frame beams $22c_1, \ldots, 22c_9$ of the tilting arm 22 are placed in the same plane, and they are connected with the arms $22d_1, 22d_2$ at the proximity of both ends of the cutter drum 11. From the ends of the arms $22d_1, 22d_2$, the felling arm 22 is mounted on the holder 23 by bearing means $26a_1, 22a_2$.

After the wood material has been brought by means of the felling arm 22, at a suitable angle, into connection with the tamping drum 17, it is carried while being pressed by the tamping drum 17 tightly against the ground E, into contact with the cutter blades $11a_1,11a_2$... on the cutter drum 11 of the cutter device 10.

Figure 1C:
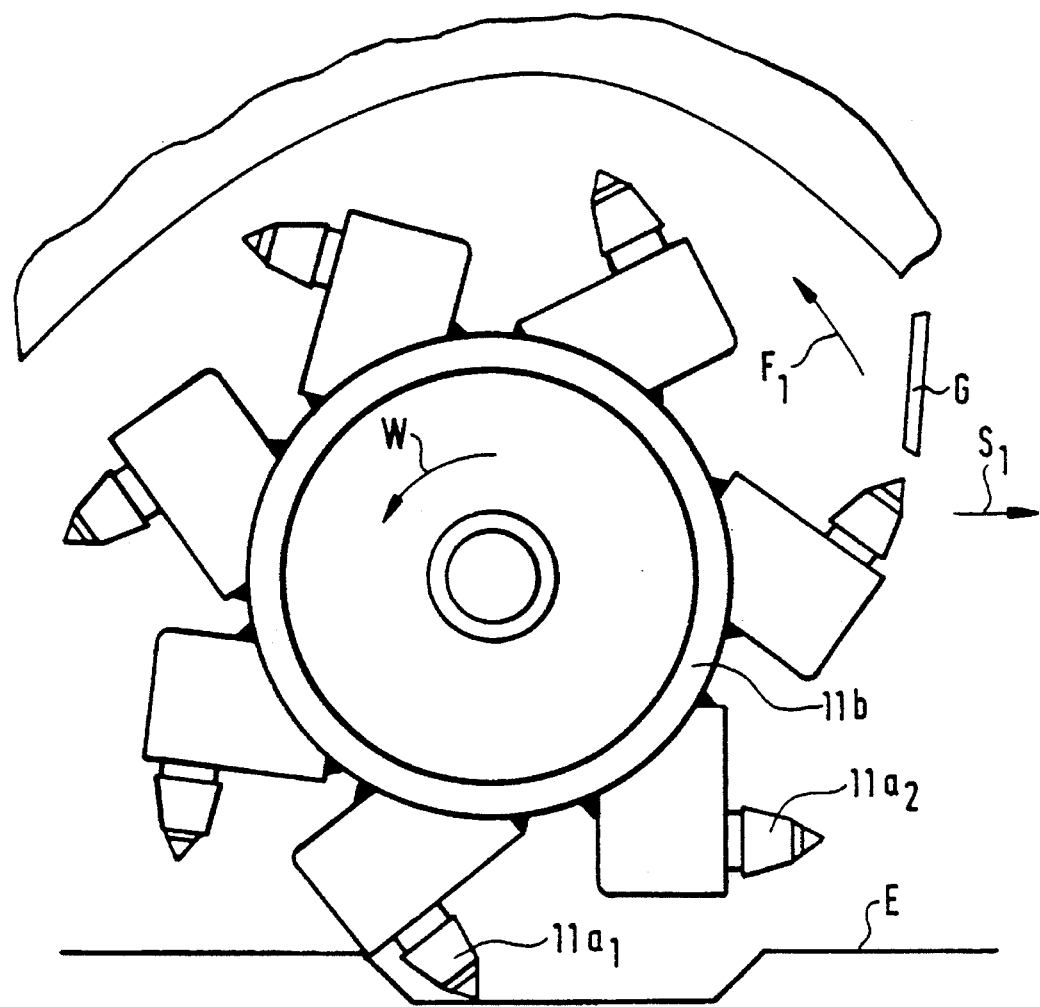
FIG. 1C is a sectional view taken along the line I—I in FIG. 1B.
Figure 1D:
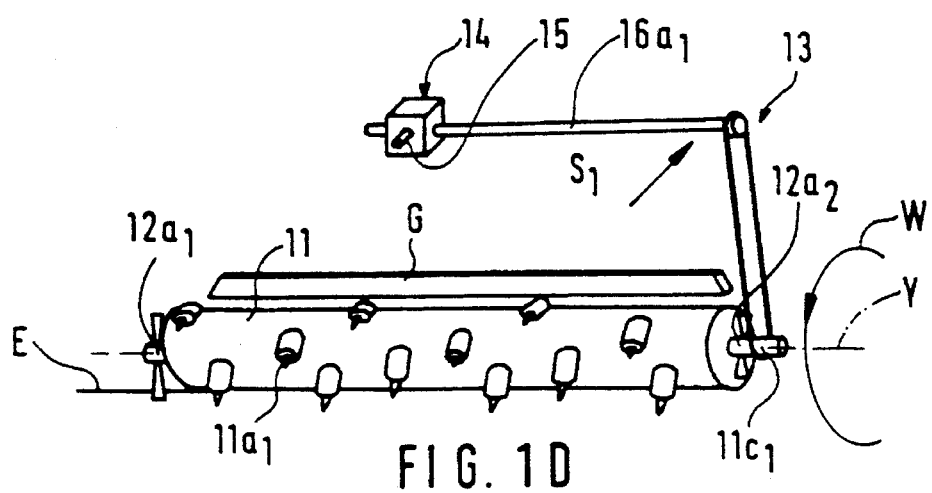
FIG. 1D is an illustration of the rotation of the cutter drum and the operation of the counter blade.

FIG. 1C is a sectional view taken along the line I—I in FIG. 1B. and illustrates the cutter drum 11 comprising cutter blades $11a_1,11a_2$... placed on the mantle $11b$ of the cutter drum. The blades cut through the wood material and the soil and shift them beyond a counter blade G further to the rear side of the cutter drum 11, as shown by arrow $F_1$.

FIG. 1D is an illustration of the rotation of the cutter drum 11 and the operation of the counter blade G. From the power machine of the tractor, through the power take-off, the rotation and the drive are brought to the transmission and further to the shaft $11c_1$ of the cutter drum 11. The cutter drum crushes the wood material by means of the blades $11a_1,11a_2$ and transfers the material into contact with the counter blade G, which splits the wood material into small particles. After this, along with the rotation W of the cutter drum 11, the wood material is transferred to the rear side of the cutter drum 11. The cutter blades $11a_1,11a_2$ penetrate deep into the ground whereby they detach the soil and the wood material at least partly with the roots.

Figure 2A:
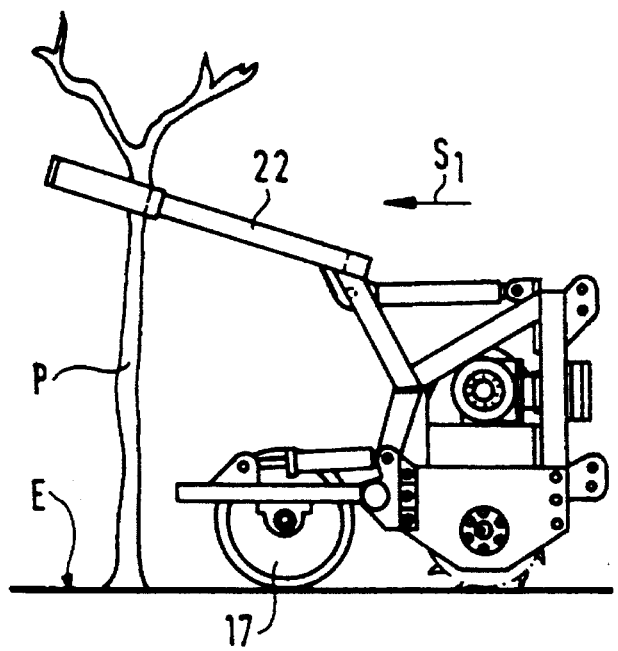
FIG. 2A shows a device in accordance with the invention in operation at a stage in which the felling arm has been brought against a tree.
Figure 2B:
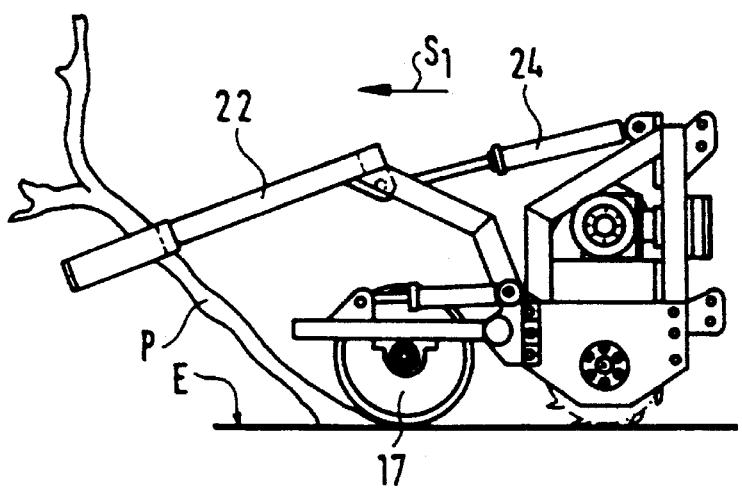
FIG. 2B shows the invention in operation at a stage in which the tree is tilted to a suitable angle in relation to the root point in view of the tamping drum.

FIGS. 2A and 2B show the operation of the device in accordance with the invention. As shown in FIG. 2A, the cutter device 10 is passed, e.g., when pushed by a tractor, against a tree/bush P. The tree P is pressed towards the ground by operating the actuator 24 so that the stem of the tree is brought at a favorable angle into connection with the tamping drum 17 and further reaches the cutter drum 11 of the cutter device 10 when pressed against the ground E by means of the tamping drum.

Figure 2C:
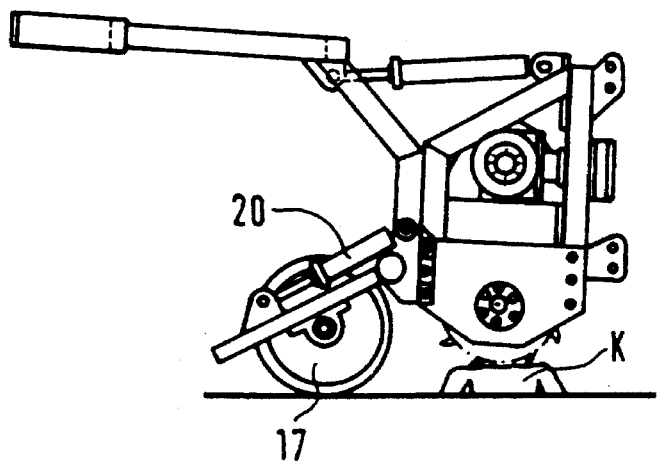
FIG. 2C shows the invention in operation at a stage in which the frame of the cutter device is supported by means of the tamping drum while the cutter cuts a tree stump.

FIG. 2C shows a cutter device 10 in accordance with the invention crushing a tree stump K. At this stage, the cutter device is held stationary, and is supported on the ground E by means of the tamping drum 17. Thus, this support is obtained by operating the actuator 20 of the tamping drum in order to position the tamping drum 17 from the cabin of the tractor, e.g., by remote control. In this manner, the position of the tamping drum 17 is controlled between a position in which the tamping drum 17 is pressing trees against the ground, while the cutter device is advancing, and a position in which the cutter drum is crushing tree stumps, while the cutter device is stationary.

Figure 3:
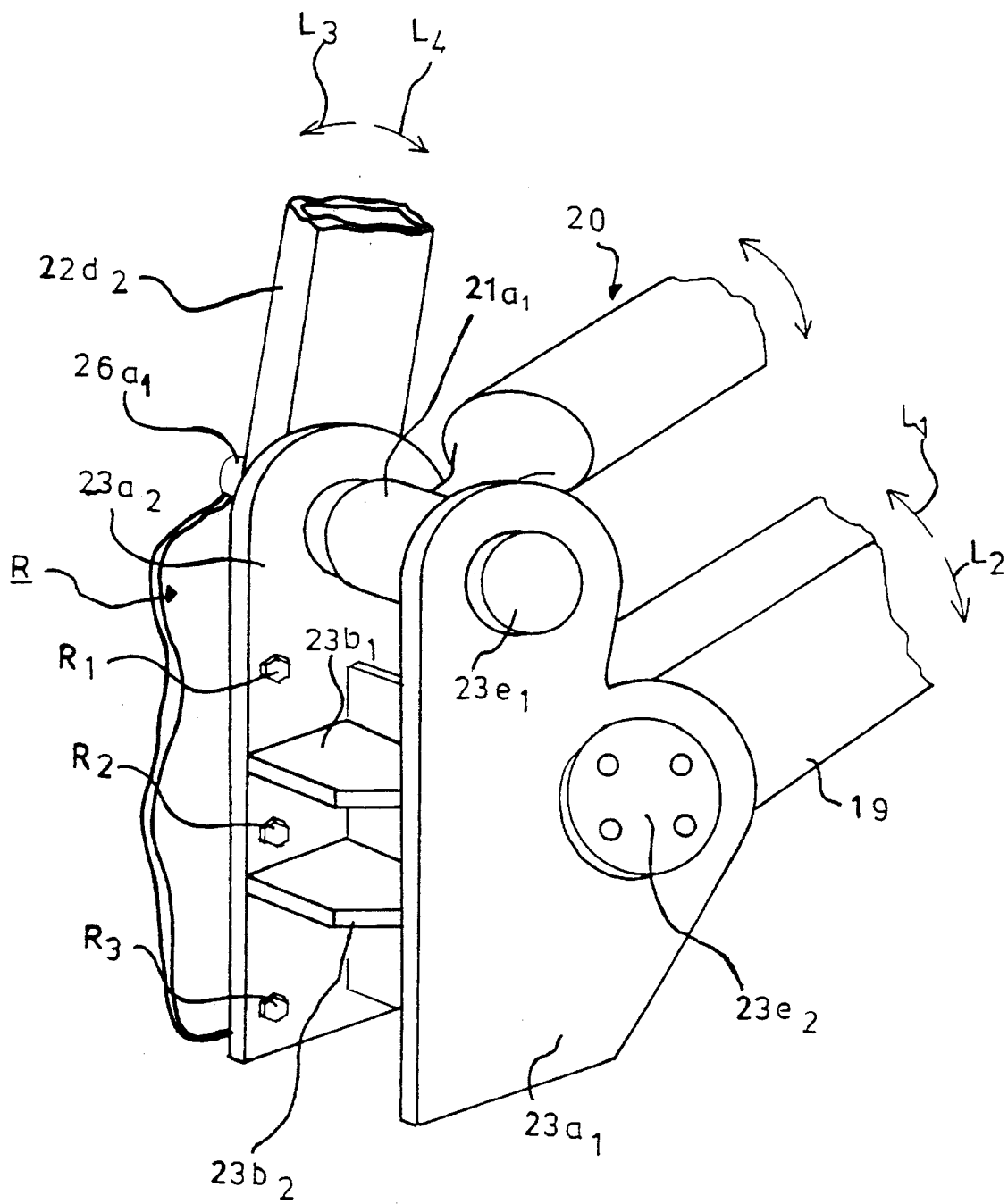
FIG. 3 is an axonometric view of the mounting of the tamping drum in accordance with the invention and of the felling arm in accordance with the invention, which are positioned by means of actuators on the holder which is mounted further on the frame of the cutter device.

FIG. 3 is an axonometric view of the mounting of the frame 19 of the tamping drum 17 and of the felling arm 22 on a separate holder 23, which is attached to the basic frame R of the cutter device by means of screw devices $R_1,R_2,R_3$. There are two holders 23, one at each end of the cutter drum.

Figure 4A:
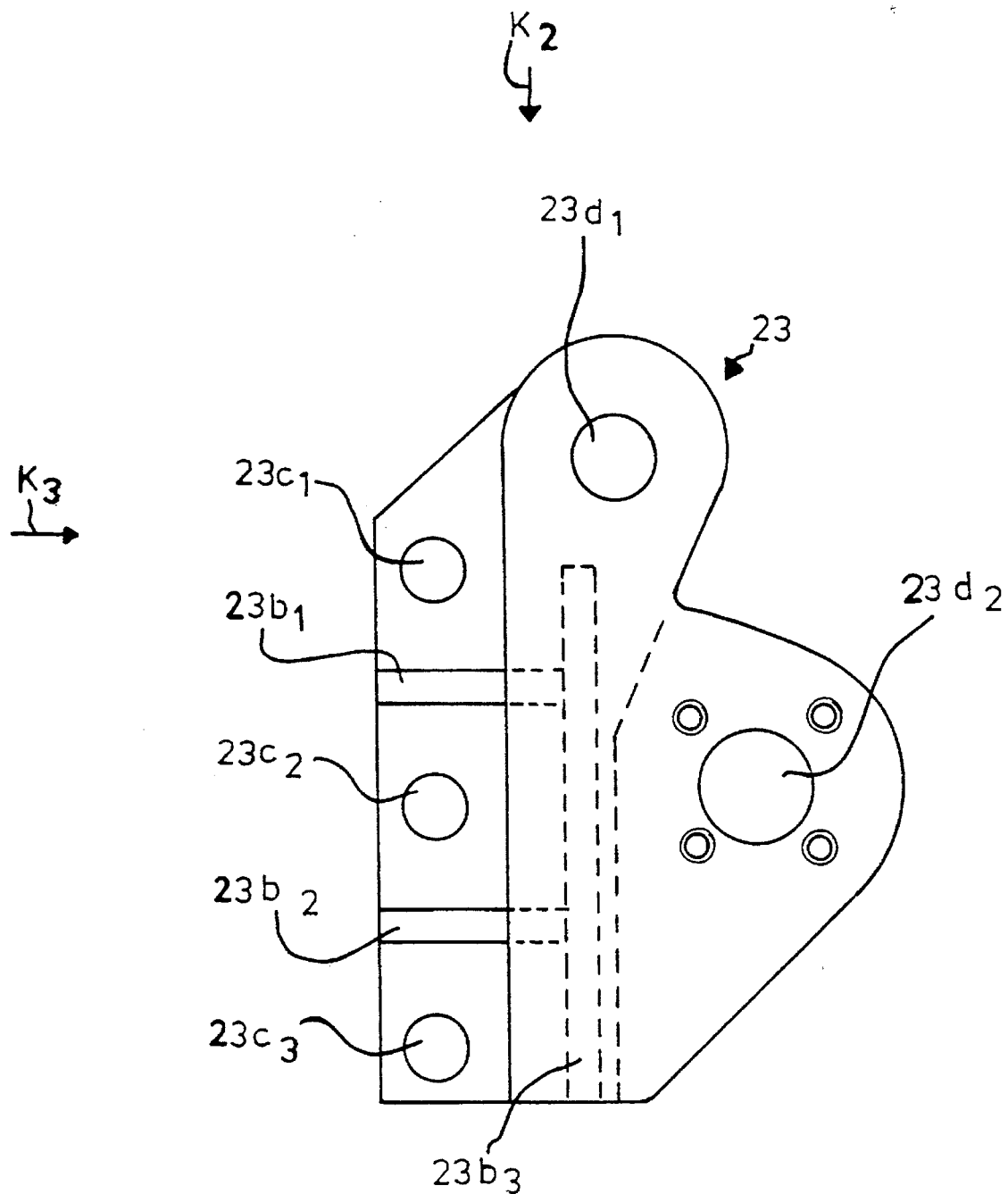
FIG. 4A is a side view of the holder.
Figure 4B:
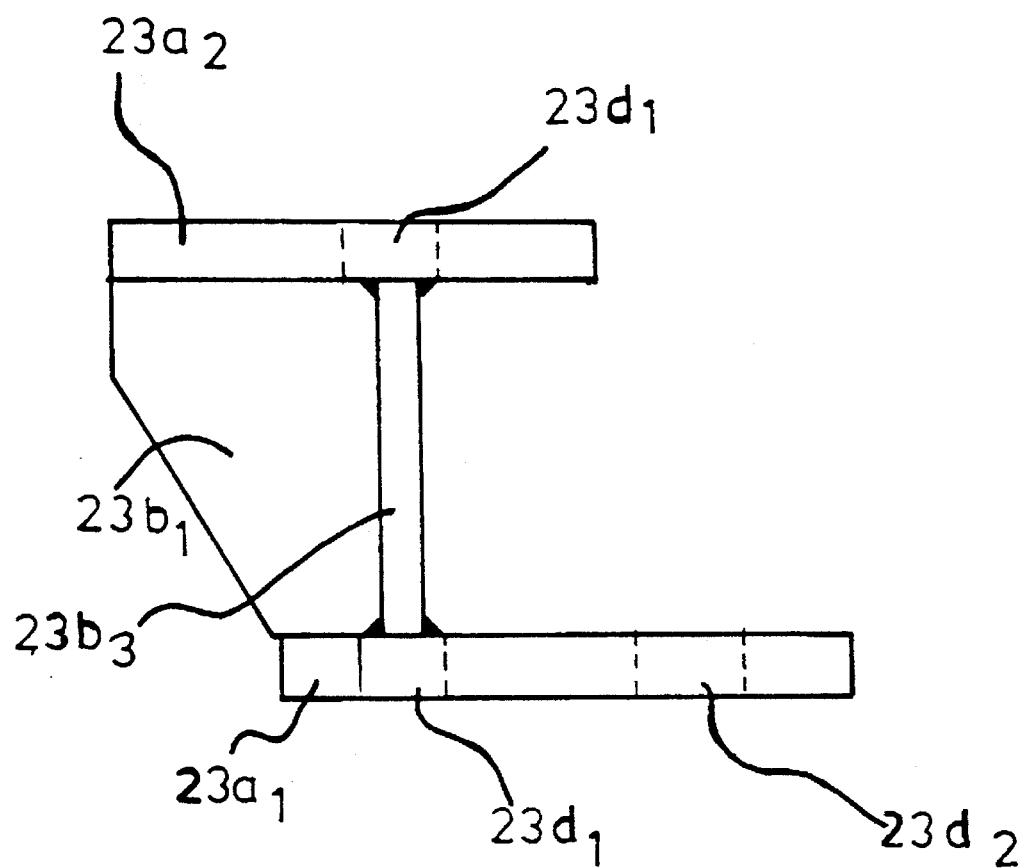
FIG. 4B shows the holder viewed in the direction of the arrow $K_2$ in FIG. 4A.
Figure 4C:
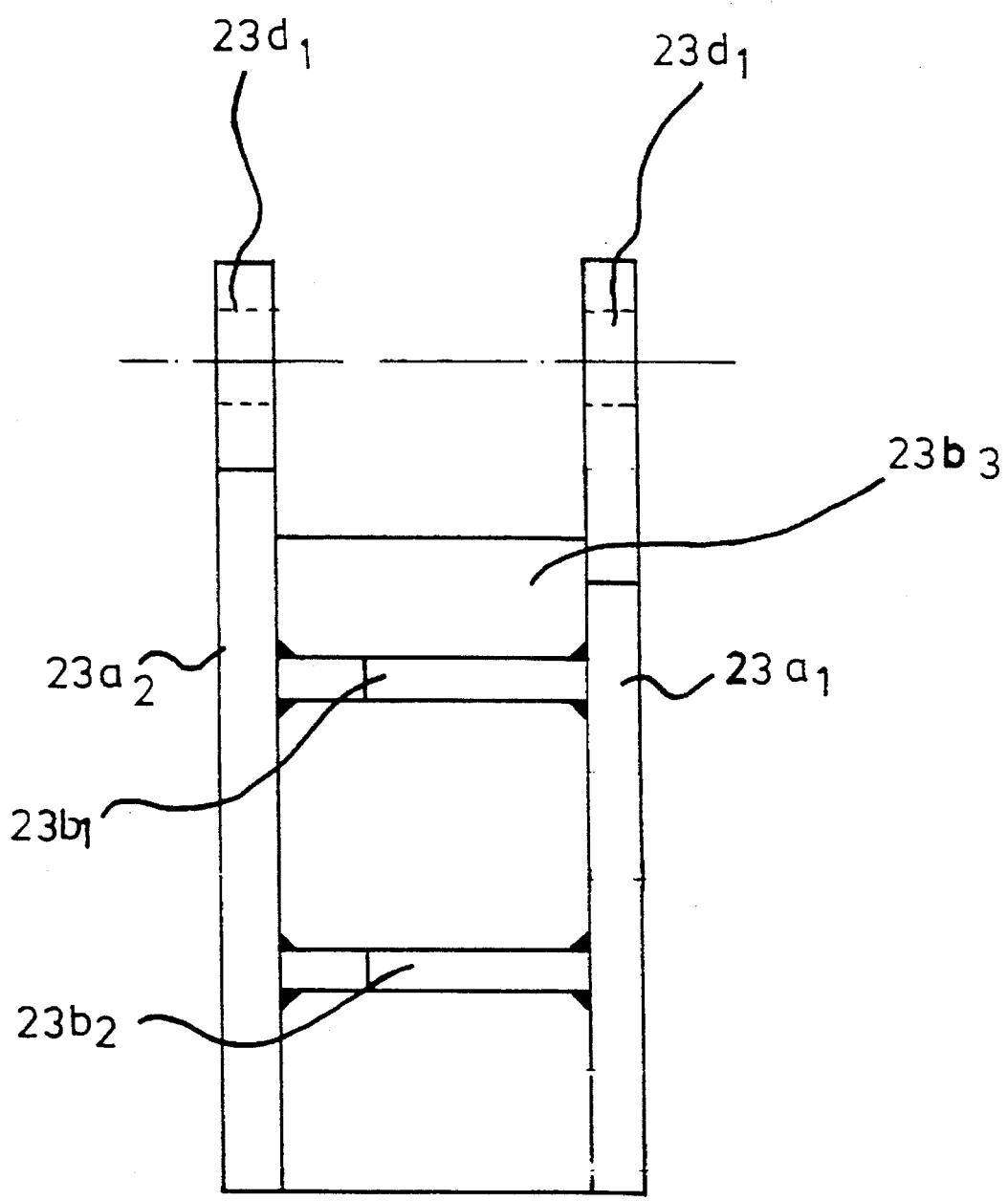
FIG. 4C shows the holder viewed in the direction of the arrow $K_3$ in FIG. 4A.

FIG. 4A is a side view of the holder 23. FIG. 4B shows the holder of FIG. 4A in the direction of arrow $K_2$, and FIG. 4C shows the holder viewed in the direction of arrow $K_3$ in FIG. 4A.

As shown in FIG. 3, the holder 23 comprises two cheek plates $23a_1$ and $23a_2$ and connecting intermediate plates $23b_1$, $23b_2$ and $23b_3$. The cheek plate $23a_2$ comprises holes $23c_1,23c_2,23c_3$ through which screw means $R_1,R_2,R_3$ are passed through the holes in the frame R for fastening the holder 23 to the frame R of the cutter device 10. Also, as shown in FIG. 3, the cheek plate $23a_2$ and the cheek plate $23a_1$ comprise coaxial holes $23d_1$, through which a shaft $23e_1$ is passed. On the portion of the shaft $23e_1$ between the cheek plates $23a_1$ and $23a_2$, the actuator 20 is mounted which displaces the frame 19 of the tamping drum 17. The arm $22d_1$ of the felling arm 22 is mounted by bearing means $26a_1$ on the end of the shaft $23e_1$ that projects from the cheek plate $23a_2$.

Similarly, the shaft $23e_2$ is arranged to fit in the hole $23d_2$ of the cheek plate $23a_2$, on which shaft the frame 19 of the tamping drum 17 is mounted. The shaft $23e_1$ comprises a flange wider than the shaft portion, from which flange the shaft $23e_2$ is connected with the cheek plate $23a_2$ of the drum.

The separate actuators for the felling arm 22 and the tamping drum 17 enable the displacement of the tamping drum and the felling arm to be independently controlling, e.g., by remote control.

The examples provided above are not meant to be exclusive. Many other variations of the present invention would be obvious to those skilled in the art, and are contemplated to be within the scope of the appended claims.

I claim:

1. Cutter device including a frame and a cutter drum coupled to said frame and having cutter blades which work soil and wood material, comprising a displaceable tamping drum, a tamping drum frame on which said tamping drum is mounted for rotation, first displacement means for displacing said tamping drum frame and therefore said tamping drum rotatably mounted thereto relative to said frame of the cutter device, a felling arm arranged above said tamping drum and coupled to said frame of the cutter device, and second displacement means for displacing said felling arm, said second displacement means comprising an actuator coupled to said felling arm and displacing said felling arm outward from said frame of the cutter device to tilt wood material in a path of the cutter device to a suitable angle of inlet into engagement with said tamping drum, said tamping drum pressing the wood material against a ground surface such that the wood material enters into contact with said cutter blades of said cutter drum.

2. The cutter device of claim 1, wherein said first displacement means comprise a cylinder device.

3. The cutter device of claim 1, wherein said tamping drum frame is coupled to said frame of the cutter service.

4. The cutter device of claim 1, wherein said actuator is a cylinder device and is arranged between said frame of the cutter device and said felling arm.

5. The cutter device of claim 1, further comprising a holder connected to said frame of the cutter device, said tamping drum frame and said felling arm being mounted on said holder.

6. The cutter device of claim 5, further comprising screws to attach said holder to said frame of the cutter device, first link means for linking said tamping drum frame to said holder, and second link means for linking said first displacement means to said holder.

7. The cutter device of claim 5, further comprising a shaft arranged on said holder, said felling arm and said first displacement means being linked with said holder via said shaft.

8. The cutter device of claim 1, wherein said tamping drum comprises a mantle and mantle rigidifiers having a substantially triangular shape for reinforcing said tamping drum.

9. The cutter device of claim 1, wherein said first displacement means comprise first and second actuators arranged on a respective side of the cutter device.

10. The cutter device of claim 1, further comprising bearing means for enabling rotation of said tamping drum, said bearing means being arranged in connection with said tamping drum frame.

11. The cutter device of claim 1, wherein said tamping drum constitutes support means for supporting the cutter device when the cutter device is in a stationary position.

12. The cutter device of claim 1, wherein said first displacement means displace said tamping drum in a direction substantially perpendicular to the ground.

13. The cutter device of claim 1, further comprising a holder connected to said frame of the cutter device, said first displacement means comprising a cylinder connected to said holder and a rod extendible from said cylinder, said rod being connected to said tamping drum frame at a distance from said holder, said tamping drum frame being connected to said holder at a distance from said cylinder to enable rotation of said tamping drum frame about said holder upon extension of said rod.

14. The cutter device of claim 1, further comprising a counter blade coupled to said frame in a position such that said cutter blades by-pass said counter blade.

15. In a method for clearing trees/bushes and tilling soil in which a cutter device is displaced by a tractor or other power unit and comprises a cutter drum and cutter blades mounted on the cutter drum, the improvement comprising the steps of:

arranging a felling arm and a tamping drum on the cutter device, displacing the felling arm in a direction away from the cutter device to push wood material toward the ground, pressing the wood material against the ground by means of a tamping drum, and passing the pressed wood material into contact with the cutter blades on the cutter drum.

16. The method of claim 15, further comprising the steps of:

coupling the cutter device to the tractor or other power unit and pushing the cutter device in an advancing direction.

17. The method of claim 15, further comprising the step of controlling the positioning of the tamping drum relative to movement of the cutter device such that the tamping drum supports the cutter device when the cutter device is stationary.

18. The method of claim 15, further comprising the steps of:

providing means to enable displacement of the tamping drum relative to a frame of the cutter device, and independently controlling the displacement of the tamping drum and the felling arm by remote control by providing separate actuators coupled to the tamping drum and the felling arm.

\* \* \* \* \*